(12) United States Patent
Coleraine et al.

(10) Patent No.: US 8,757,646 B2
(45) Date of Patent: Jun. 24, 2014

(54) TRANSPORT CHAIR ALLOWING TRANSPORT OF MULTIPLE PASSENGERS

(71) Applicants: Lisa Webb Coleraine, Virginia Beach, VA (US); Kathryn Webb Braswell, Virginia Beach, VA (US); Joyce Webb Rucker, Virginia Beach, VA (US)

(72) Inventors: Lisa Webb Coleraine, Virginia Beach, VA (US); Kathryn Webb Braswell, Virginia Beach, VA (US); Joyce Webb Rucker, Virginia Beach, VA (US)

(73) Assignee: Penny Trail Express, Inc., Madison, TN (US)

( * ) Notice: Subject to any disclaimer, the term of this patent is extended or adjusted under 35 U.S.C. 154(b) by 0 days.

(21) Appl. No.: 13/645,430

(22) Filed: Oct. 4, 2012

(65) Prior Publication Data

US 2014/0097597 A1     Apr. 10, 2014

Related U.S. Application Data

(60) Provisional application No. 61/544,394, filed on Oct. 7, 2011.

(51) Int. Cl.
*B62B 7/00* (2006.01)

(52) U.S. Cl.
CPC ..................... *B62B 7/008* (2013.01)

USPC ......................................................... 280/47.4

(58) Field of Classification Search
USPC ......... 280/647, 47.4, 250.1, 642; 297/243, 45
See application file for complete search history.

(56) References Cited

U.S. PATENT DOCUMENTS

| | | | | |
|---|---|---|---|---|
| 2,485,016 A * | 10/1949 | Rideout | ........................ | 297/45 |
| 2,859,837 A * | 11/1958 | Mize | ........................ | 188/2 F |
| 3,612,603 A * | 10/1971 | Snyder et al. | ................. | 297/130 |
| 4,682,783 A * | 7/1987 | Kuschall | ..................... | 280/250.1 |
| 5,263,730 A * | 11/1993 | Roach et al. | ................... | 280/47.4 |
| 6,676,140 B1 * | 1/2004 | Gondobintoro | .......... | 280/33.993 |
| 6,843,498 B2 * | 1/2005 | Bretschger et al. | .......... | 280/642 |
| 7,360,781 B2 * | 4/2008 | Schreiber et al. | ........... | 280/250.1 |
| 7,487,977 B2 * | 2/2009 | Johnson | ..................... | 280/47.34 |
| 7,597,332 B2 * | 10/2009 | Thompson | ................. | 280/47.38 |
| 2002/0125752 A1 * | 9/2002 | Brown | ........................ | 297/250.1 |
| 2007/0145723 A1 * | 6/2007 | Kamara | ........................ | 280/647 |
| 2009/0001689 A1 * | 1/2009 | Swenson | ..................... | 280/304.1 |

* cited by examiner

*Primary Examiner* — Katy M Ebner
*Assistant Examiner* — Brian Cassidy

(57) ABSTRACT

A transport chair enables one person to provide mobility to two passengers simultaneously. The transport chair can include two seats, allowing a care giver to provide a fast, safe and less stressful solution for providing mobility to multiple passengers. The transport chair can collapse similar to a conventional wheelchair to provide for ease of storage.

10 Claims, 4 Drawing Sheets ated for providing two mobility to two passengers simultaneously.

TRANSPORT CHAIR ALLOWING TRANSPORT OF MULTIPLE PASSENGERS

CROSS-REFERENCE TO RELATED APPLICATION

This application claims the benefit of priority of U.S. provisional application No. 61/544,394, filed Oct. 7, 2011, the contents of which are herein incorporated by reference.

BACKGROUND OF THE INVENTION

The present invention relates to transport chairs and, more particularly, to a transport chair that enables one person to provide mobility to two passengers simultaneously.

With the aging of the baby boomer generation, care givers are likely to be less often able to provide one-on-one care to non- and semi-ambulatory individuals. In these cases, the inability to transport two persons in one transport device can be a significant inconvenience. People with two elderly parents with limited mobility can find it quite difficult to take them anywhere that requires any amount of walking. When a care giver takes two people somewhere simultaneously, such as to a physician, they often have one of them walk while the other rides in a transport chair. This can be a slow, dangerous and stressful process. One other option is to take one to the destination while leaving the other one alone until the care giver can get back to transport them. This, too, is slow, dangerous and stressful.

This scenario can arise in various situations, such as a son or daughter taking care of both of their parents, a young mother with a small child and an elderly grandmother, an attendant caring for two special needs individuals, or even something as simple as enabling a person that cannot walk long distances to be able to enjoy family outings with another family member that is just too tired to walk.

People in society today are living longer but do not necessarily stay in top notch shape. Mobility is a concern and a limitation for these people. The issue of providing mobility to two persons at once will most likely become more prevalent as caregivers are asked to give care to more than one person.

As can be seen, there is a need for a transport device that can provide mobility to more than one person at once.

SUMMARY OF THE INVENTION

In one aspect of the present invention, a transport chair comprises a first seat back and a first seat base forming a first seat; a second seat back and a second seat base forming a second seat, the second seat disposed behind the first seat; a foot rest disposed in front of the first seat; a platform plate disposed in front of the second seat; a frame supporting the first seat and the second seat; and a set of front wheels and a set of rear wheels supporting the frame.

In another aspect of the present invention, a transport chair comprises a first seat back and a first seat base forming a first seat; a second seat back and a second seat base forming a second seat, the second seat disposed behind the first seat; a foot rest disposed in front of the first seat; a platform plate disposed in front of the second seat; a frame supporting the first seat and the second seat; a set of front wheels and a set of rear wheels supporting the frame; a first handle disposed behind the second seat back, the first handle adapted to permit a care giver to move the transport chair; a second handle disposed behind the first seat back, the second handle providing a grip for a passenger in the second seat; and a scissor brace connecting together the frame, the scissor brace allowing the frame to collapse when the transport chair is not in use.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a transport chair that enables one person to provide mobility to two passengers simultaneously. The transport chair can include two seats, allowing a care giver to provide a fast, safe and less stressful solution for providing mobility to multiple passengers. The transport chair can collapse similar to a conventional wheelchair to provide for ease of storage.

Figure 1:
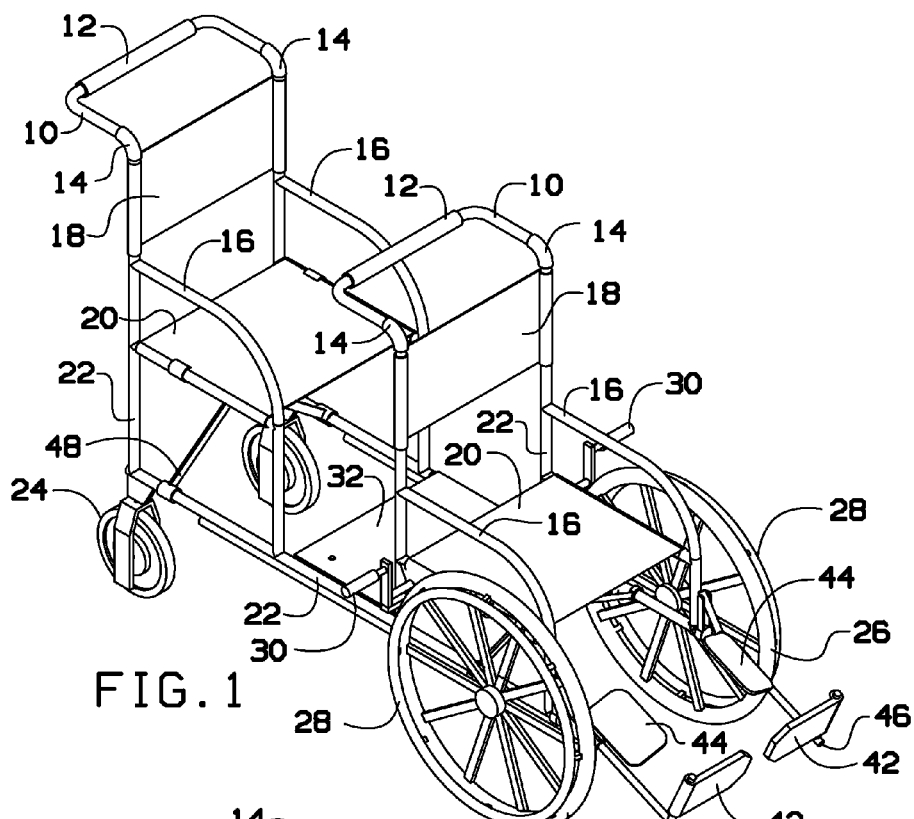
FIG. 1 is a front perspective view of a transport chair according to an exemplary embodiment of the present invention.
Figure 2:
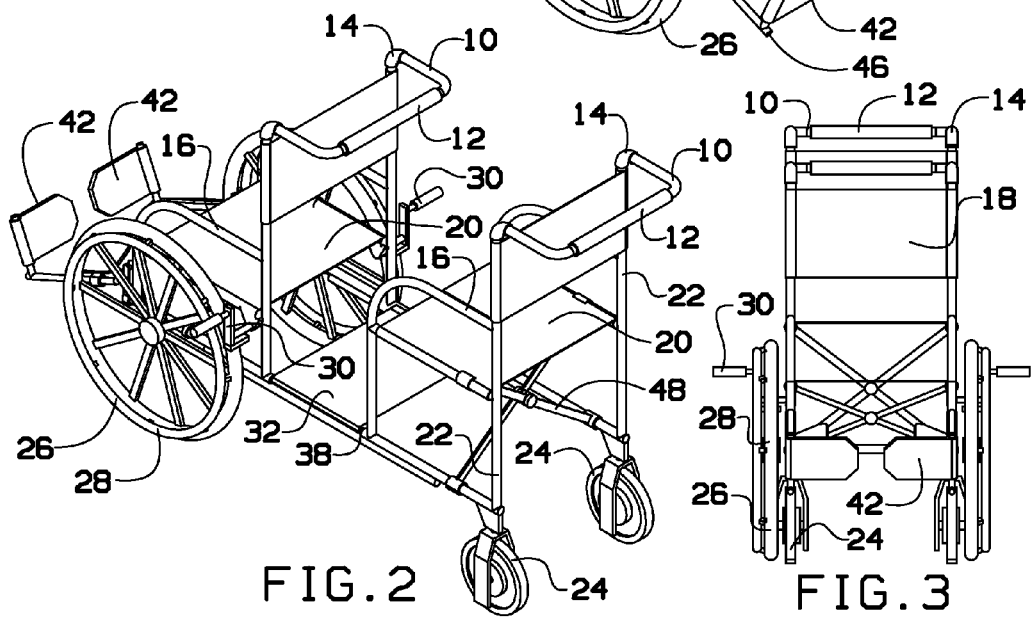
FIG. 2 is a back perspective view of the transport chair of FIG. 1.
Figure 3:
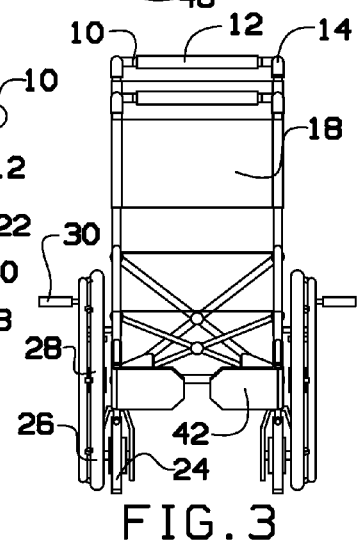
FIG. 3 is a front view of the transport chair of FIG. 1.
Figure 4:
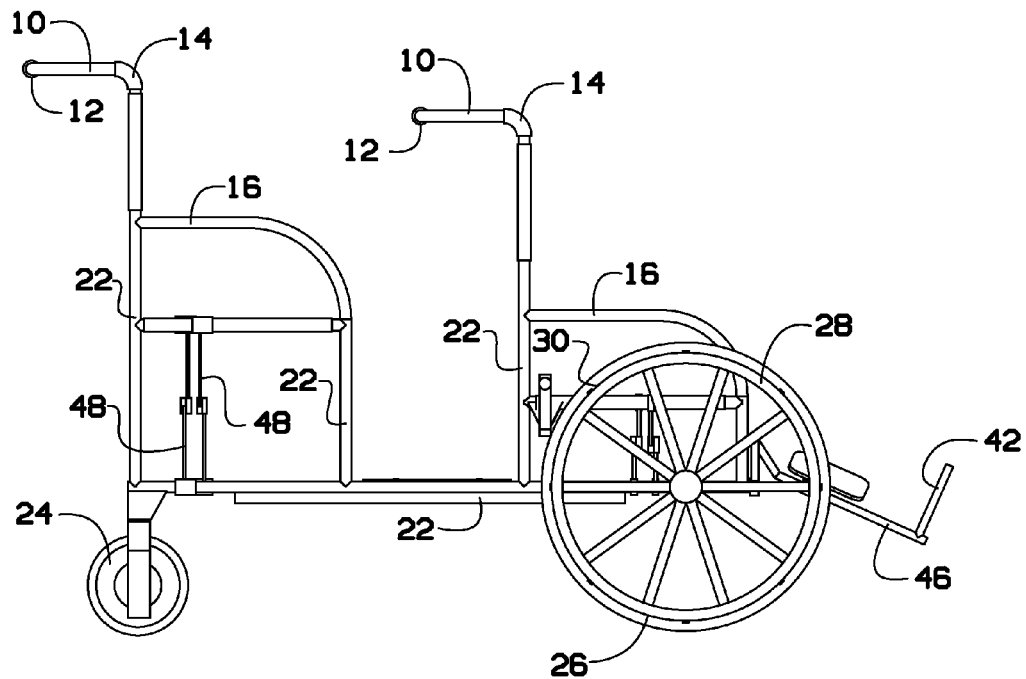
FIG. 4 is a side view of the transport chair of FIG. 1.
Figure 5:
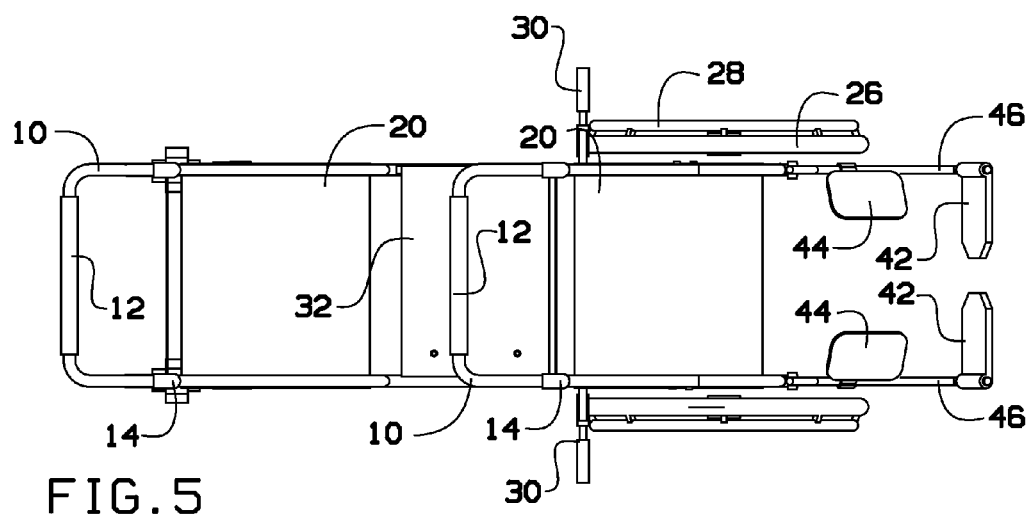
FIG. 5 is a top view of the transport chair of FIG. 1.
Figure 6:
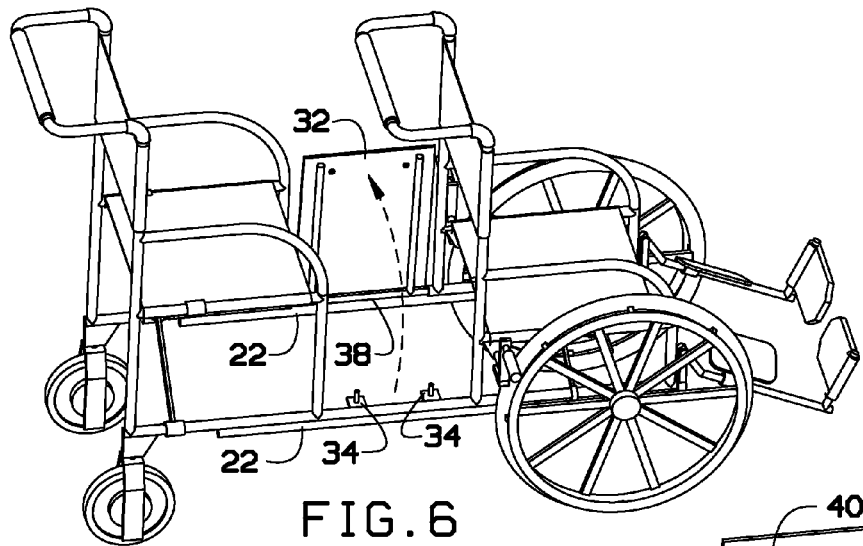
FIG. 6 is a side perspective view of the transport chair of FIG. 1 showing rotation of its platform plate.
Figure 7:
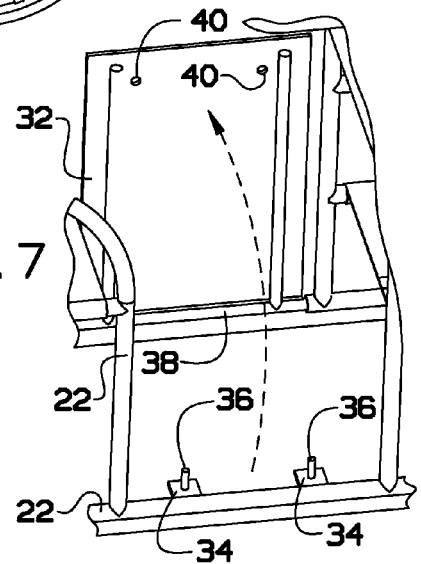
FIG. 7 is a detailed perspective view of the transport chair of FIG. 1 showing rotation of its platform plate.
Figure 8:
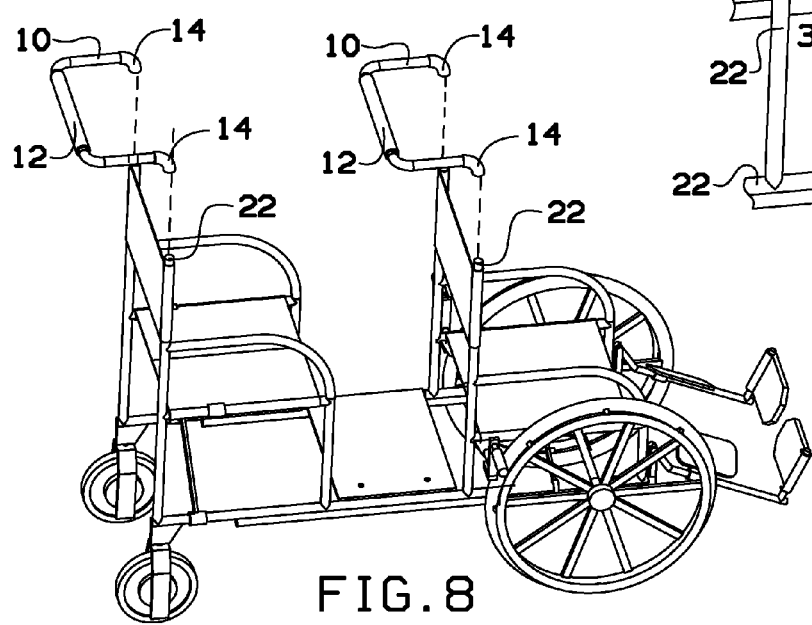
FIG. 8 is a side perspective view of the transport chair of FIG. 1 showing removal of the handles.
Figures 9, 10:
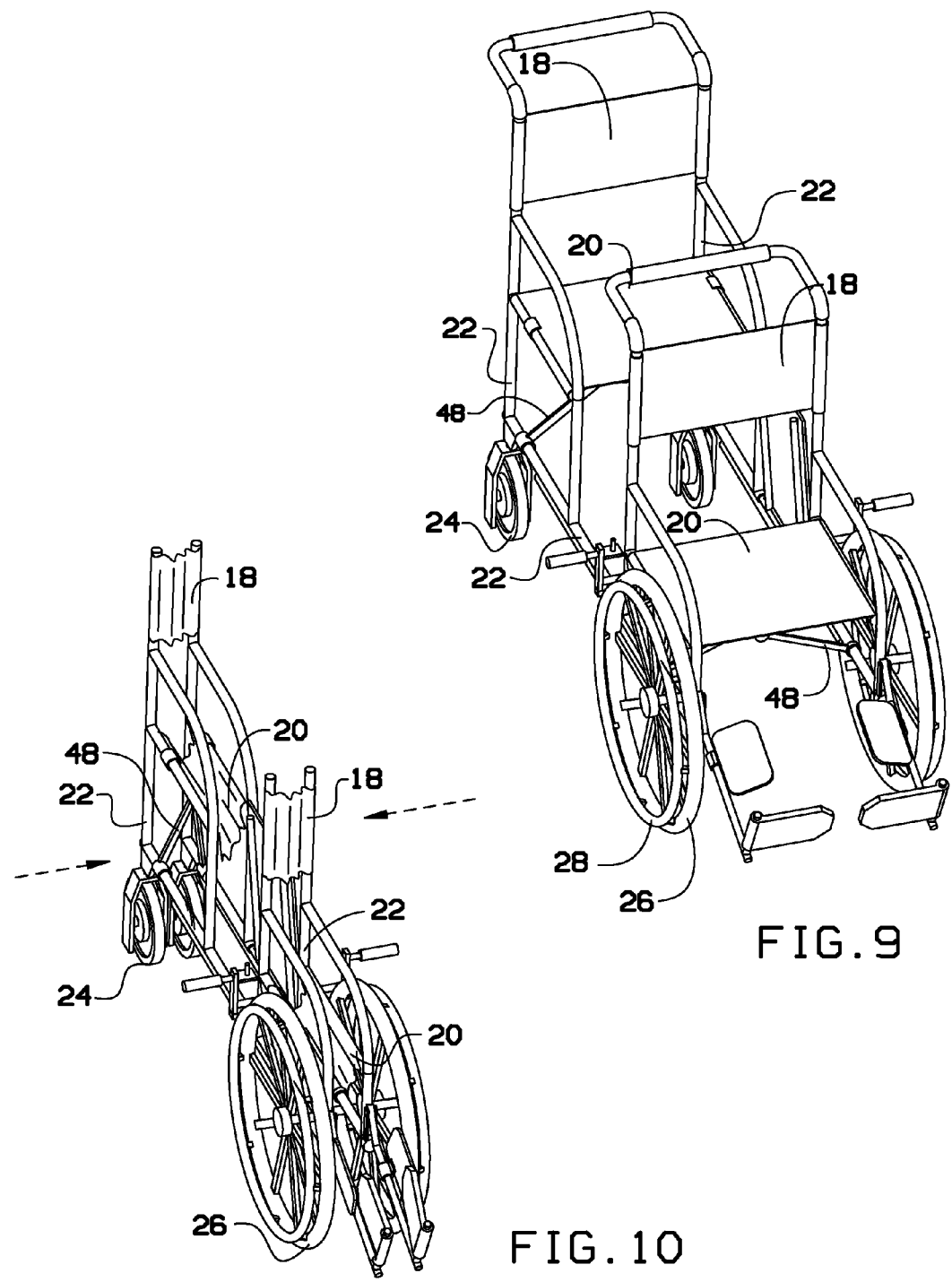
FIG. 9 is a front perspective view of the transport chair of FIG. 1.
FIG. 10 is a front perspective view of the transport chair of FIG. 1, with the handles removed and collapsed in a transportable configuration.

Referring now to FIGS. 1 through 10, a transport chair can include handles 10 having handle cushions 12 disposed thereupon. One handle 10 can be disposed behind a first, front seat and another handle 10 can be disposed behind a second, rear seat. This handle, behind the rear seat, can be used by a care giver to push the transport chair. A handle elbow joint 14 can attach each end of each handle 10 onto a frame 22 of the transport chair. The handle elbow joint 14 can allow the handles 10 to be removed from the frame 22, as shown in FIG. 8, to permit collapsing of the transport chair, as shown in FIG. 10.

Each seat can include arm rests 16, a seat back fabric 18 and a seat lower fabric 20. The seat back fabric 18 and the seat lower fabric 20 can be formed in various designs and styles, typically a flexible fabric that permits collapsing of the transport chair as shown in FIG. 10. In some embodiments of the present invention, the seat back fabric 18 and the seat lower fabric 20 can be made of a more rigid material to provide additional support to the passengers using the transport chair.

The frame can be supported by a rear caster wheel 24 and a forward wheel 26. In some embodiments, the forward wheel 26 can be large wheel (having a diameter from about 18 to 24 inches, for example) similar to that found in a conventional wheelchair. The rear caster wheel 24 can be a caster wheel that is smaller than the forward wheel 26. In some embodiments, however, the forward wheel 26 and the rear wheel 24 can be both the same size and shape. In some embodiments, other wheel designs and styles can be used. For example, for use on beach sand, wider wheels may be provided for ease of use.

Wheel brakes 30 can be provided to prevent rotation of at least one of the forward wheel 26 or the rear wheel 24. A rim 28 can be provided on the wheel 26 as is known in the art. In some embodiments, a fender (not shown) can cover the forward wheels 26 to prevent pinching hazards from a user in the front position of the transport chair.

The passenger in the front seat can have a foot rest 42 and a leg rest 44 disposed on a foot/leg rest bracket 46 to permit the user to raise and rest their feet and legs. The foot rest 42 and the leg rest 44 may be adjustable similar to that found in a conventional wheelchair.

A platform plate 32 can be provided for a passenger in the rear seat to rest their feet. The platform plate 32 can include a platform stop plate 34 to support the platform plate 32 in a lowered position. The platform plate 32 can attach to the frame 22 with a platform plate hinge 38 along one side thereof, allowing the platform plate 32 to be raised (FIG. 6) and lowered (FIG. 8). Platform plate pins 36 can extend from the platform plate stop plate 34. The platform plate pins 36 can fit through a platform plate pin hole 40 in the platform plate 32. This configuration ensures the transport chair is fully un-collapsed and prevents the transport chair from collapsing.

A scissor brace 48 can be disposed to connect the frame members 22 on each side of the transport chair. The scissor brace 48 can permit the transport chair to collapse as shown in FIG. 10.

While the above description and drawings describe a transport chair for two passengers, the chair could be designed longer with one or more additional seats, providing a transport chair for even more than two passengers.

The transport chair of the present invention can be customized with various accessories. For example, the transport chair can include a sun roof, one or more cup holders, baskets to hold items, and the like.

It should be understood, of course, that the foregoing relates to exemplary embodiments of the invention and that modifications may be made without departing from the spirit and scope of the invention as set forth in the following claims.

What is claimed is:

1. A transport chair comprising:
   a first seat back and a first seat base forming a first seat;
   a second seat back and a second seat base forming a second seat, the second seat disposed behind the first seat;
   a first handle disposed behind the second seat back, the first handle adapted to permit a care giver to move the transport chair;
   an integral frame including a first side frame member and a second side frame member extending from a set of front wheels to a set of rear wheels, the integral frame supporting the first seat and the second seat;
   a platform plate disposed in front of the second seat, the platform plate pivotable on the first side frame member to permit the platform plate to lift off the second side frame member; and
   a foot rest disposed in front of the first seat, the foot rest extending forward of the frame and providing a support for a user's feet.

2. The transport chair of claim 1, further comprising a handle disposed behind the first seat back, the handle providing a grip for a passenger in the second seat.

3. The transport chair of claim 1, further comprising a scissor brace connecting together the frame, the scissor brace allowing the frame to collapse when the transport chair is not in use.

4. The transport chair of claim 1, wherein the platform plate is connected to the frame with a hinge.

5. The transport chair of claim 1, further comprising:
   a platform plate stop plate disposed along a first side of the frame;
   a hinge connecting the platform plate to a second, opposite side of the frame;
   a stop plate pin extending from the platform plate stop plate; and
   a platform plate pin hole disposed in the platform plate, the platform plate pin hole operable to receive the stop plate pin when the platform plate is disposed in an in-use configuration.

6. The transport chair of claim 1, further comprising one or more wheel brakes operable to prevent rotation of one of more of the wheels.

7. A transport chair comprising:
   a first seat back and a first seat base forming a first seat;
   a second seat back and a second seat base forming a second seat, the second seat disposed behind the first seat;
   a foot rest disposed in front of the first seat;
   a platform plate disposed in front of the second seat, the platform plate configured to permit a user to walk thereupon to enter and exit the second seat;
   an integral frame including a first side frame member and a second side frame member extending from a set of front wheels to a set of rear wheels, the integral frame supporting the first seat and the second seat;
   a first handle disposed behind the second seat back, the first handle adapted to permit a care giver to move the transport chair;
   a second handle disposed behind the first seat back, the second handle providing a grip for a passenger in the second seat; and
   a scissor brace connecting together the frame, the scissor brace allowing the frame to collapse when the transport chair is not in use, wherein
   the platform plate is pivotable on the first side frame member to permit the platform plate to lift off the second side frame member.

8. The transport chair of claim 7, further comprising:
   a platform plate stop plate disposed along a first side of the frame;
   a hinge connecting the platform plate to a second, opposite side of the frame;
   a stop plate pin extending from the platform plate stop plate; and
   a platform plate pin hole disposed in the platform plate, the platform plate pin hole operable to receive the stop plate pin when the platform plate is disposed in an in-use configuration.

9. The transport chair of claim 7, further comprising one or more wheel brakes operable to prevent rotation of one of more of the wheels.

10. The transport chair of claim 7, wherein the first handle and the second handle are removable from the frame.

* * * * *